United States Patent
Oveyssi

(10) Patent No.: US 6,937,444 B1
(45) Date of Patent: Aug. 30, 2005

(54) DISK DRIVE ROTARY ACTUATOR ASSEMBLY HAVING A CONSTRAINED LAYER DAMPER ATTACHED TO A FLAT ACTUATOR COIL

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 187 days.

(21) Appl. No.: 10/376,833

(22) Filed: Feb. 28, 2003

(51) Int. Cl.[7] .............................. G11B 21/08; G11B 5/55
(52) U.S. Cl. .................................................. 360/265.8
(58) Field of Search ........................ 360/265.8, 265.7, 360/266.4, 266.7, 266.8, 266.9, 264.1, 264, 360/260, 240, 97.02

(56) References Cited

U.S. PATENT DOCUMENTS

| | | | | |
|---|---|---|---|---|
| 4,144,466 A | | 3/1979 | Hatch | 310/13 |
| 4,728,831 A | | 3/1988 | Cheng | 310/13 |
| 5,148,071 A | * | 9/1992 | Takahashi | 310/208 |
| 6,563,676 B1 | * | 5/2003 | Chew et al. | 360/264.7 |
| 6,600,633 B2 | * | 7/2003 | Macpherson et al. | 360/265.8 |
| 2004/0095682 A1 | * | 5/2004 | Dominguez et al. | 360/265 |

OTHER PUBLICATIONS

Damped Voice Coil/Bobbin Assembly; IBM Technical Disclosure Bulletin, Nov. 1973, p. 1816.

* cited by examiner

*Primary Examiner*—Julie Anne Watko
(74) *Attorney, Agent, or Firm*—Joshua C. Harrison, Esq.

(57) ABSTRACT

A head stack assembly for a disk drive includes a rotary actuator assembly. The rotary actuator assembly includes an actuator body having a bore defining a pivot axis, an actuator arm cantilevered from the actuator body, and a coil portion cantilevered from the actuator body in a direction opposite from the actuator arm. The coil portion includes a coil support, a flat coil supported by the coil support, the flat coil including a coil surface generally perpendicular to the pivot axis, and a constrained layer damper attached to the coil surface. The constrained layer damper includes a stiffening layer having a coil-facing planar surface generally perpendicular to the pivot axis and an adhesive layer positioned between the coil-facing planar surface and the coil surface.

9 Claims, 2 Drawing Sheets

DISK DRIVE ROTARY ACTUATOR ASSEMBLY HAVING A CONSTRAINED LAYER DAMPER ATTACHED TO A FLAT ACTUATOR COIL

BACKGROUND OF THE INVENTION

1. Field of the Invention

This invention relates to a rotary actuator assembly for a disk drive. More particularly, this invention relates to a rotary actuator assembly having a constrained layer damper attached to a flat actuator coil.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 40 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations.

Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly which typically includes the pivot bearing cartridge installed in its bore. Other components of the rotary actuator arrangement are permanent magnets and an arrangement for supporting the magnets to produce a magnetic field for a voice coil motor. The prefabricated head stack assembly includes a coil portion having a coil support and a coil forming another part of the voice coil motor. The prefabricated head stack assembly also includes a rotary actuator assembly, which includes an actuator body having a bore through it, and a plurality of actuator arms projecting parallel to each other and perpendicular to the pivot axis of the bore. The prefabricated head stack assembly also includes head gimbal assemblies that are supported by the arms. Each head gimbal assembly includes a load beam and a head supported by the load beam.

The rotary actuator assembly has various natural modes of vibration. One such mode is referred to as a "butterfly" resonance mode ("butterfly mode") or the first principal bending mode. During such a butterfly mode, the actuator arms and the coil support slightly flex or bend toward and away from each other in a plane orthogonal to the axis of rotation ("pivot axis") and the heads move away from its position on the disk. This is due to those electromagnetic forces in a direction perpendicular to a longitudinal axis of the rotary actuator assembly produced by the current through the coil and the electromagnetic forces interaction with the magnetic fields of the permanent magnets. Thus, if the natural frequency of the butterfly mode is 5 kilo hertz and the applied current into the coil has a 5 kilo hertz component, then this will result in the potential for undesirable excitation of the butterfly mode. While a filter, such as a notch filter, may be used to remove the frequency component corresponding to the natural frequency of the butterfly mode, that may negatively impact the capability of the actuator servo control system by reducing its bandwidth.

SUMMARY OF THE INVENTION

This invention can be regarded as a rotary actuator assembly for a disk drive including an actuator body having a bore defining a pivot axis, an actuator arm cantilevered from the actuator body, and a coil portion cantilevered from the actuator body in a direction opposite from the actuator arm. The coil portion includes a coil support, a flat coil supported by the coil support, the flat coil including a coil surface generally perpendicular to the pivot axis, and a constrained layer damper attached to the coil surface. The constrained layer damper includes a stiffening layer having a coil-facing planar surface generally perpendicular to the pivot axis and an adhesive layer positioned between the coil-facing planar surface and the coil surface.

This invention can also be regarded as a head stack assembly for a disk drive including a rotary actuator assembly. The rotary actuator assembly includes an actuator body having a bore defining a pivot axis, an actuator arm cantilevered from the actuator body, and a coil portion cantilevered from the actuator body in a direction opposite from the actuator arm. The coil portion includes a coil support, a flat coil supported by the coil support, the flat coil including a coil surface generally perpendicular to the pivot axis, and a constrained layer damper attached to the coil surface. The constrained layer damper includes a stiffening layer having a coil-facing planar surface generally perpendicular to the pivot axis and an adhesive layer positioned between the coil-facing planar surface and the coil surface.

This invention can also be regarded as a disk drive including a base, a spindle motor attached to the base, a disk supported by the spindle motor, and a head stack assembly supported by the base. The head stack assembly includes a rotary actuator assembly. The rotary actuator assembly includes an actuator body having a bore defining a pivot axis, an actuator arm cantilevered from the actuator body, and a coil portion cantilevered from the actuator body in a direction opposite from the actuator arm. The coil portion includes a coil support, a flat coil supported by the coil support, the flat coil including a coil surface generally perpendicular to the pivot axis, and a constrained layer damper attached to the coil surface. The constrained layer damper includes a stiffening layer having a coil-facing planar surface generally perpendicular to the pivot axis and an adhesive layer positioned between the coil-facing planar surface and the coil surface.

DESCRIPTION OF PREFERRED EMBODIMENTS

Figure 1:
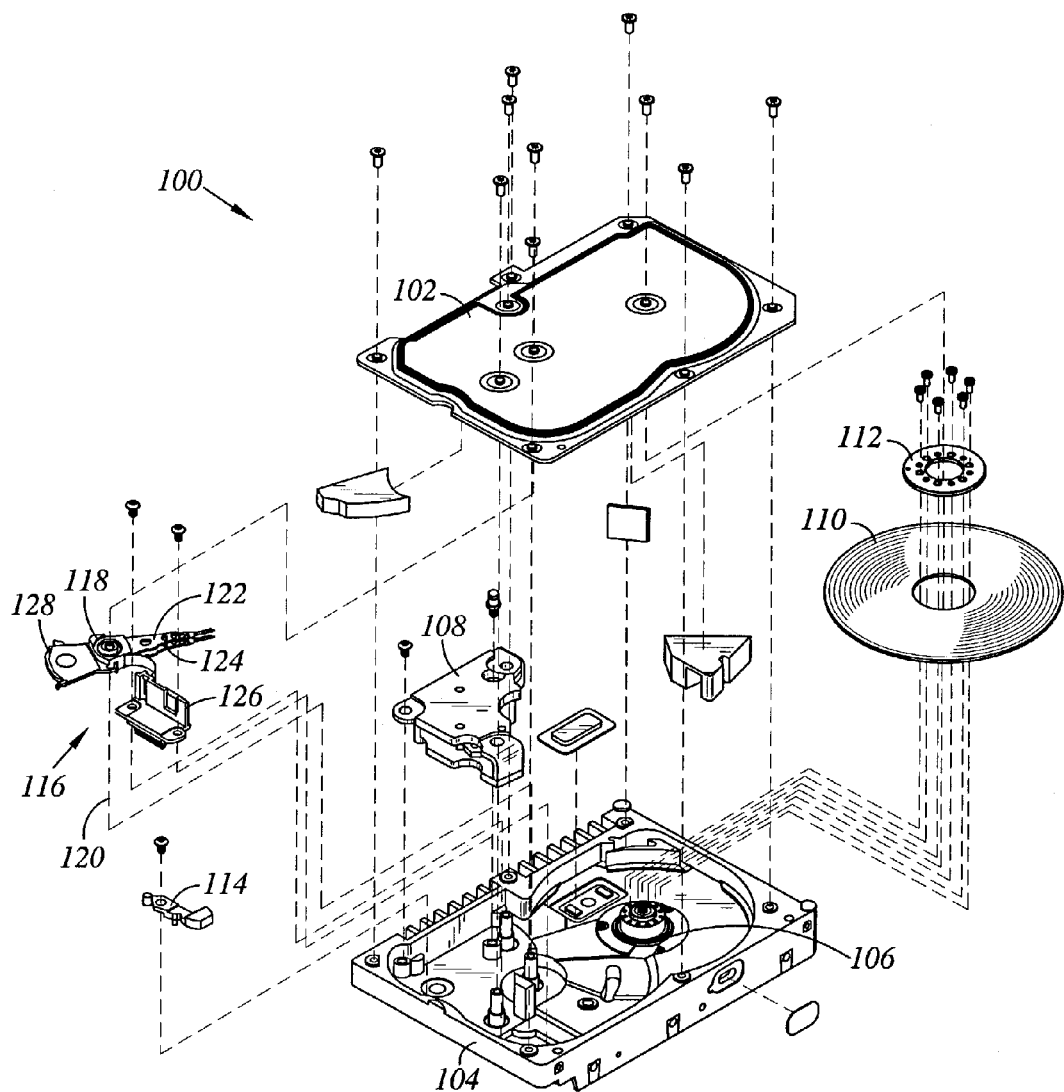
FIG. 1 is an exploded view of a disk drive incorporating an embodiment of this invention.

With reference to FIG. 1, a disk drive 100 embodying this invention includes an enclosure including a base 104 and a cover 102. The enclosure is sealed to provide a relatively contaminant-free interior for a head disk assembly (HDA) portion of disk drive 100. Suitably, a gasket is used to seal the enclosure. Disk drive 100 also includes a printed circuit board assembly (not shown) attached to base 104, which contains the circuitry for processing signals and controlling operations of disk drive 100.

Within its interior, disk drive 100 includes a magnetic disk 110 having a recording surface and includes a magnetic transducer ("head"). The particular embodiment shown in FIG. 1 includes one disk 110, providing two recording surfaces, and includes two magnetic transducers. In an alternative embodiment, a plurality of disks and a magnetic transducer associated with each recording surface of the disks may be used. Disk 110 is supported by a spindle motor 106. Disk drive 100 further includes a rotary actuator arrangement. Spindle motor 106, attached to base 104, causes disk 110 to spin, preferably at a constant angular velocity.

The rotary actuator arrangement provides for positioning a magnetic transducer over a selected area of a recording surface of disk 110. The rotary actuator arrangement includes a permanent-magnet arrangement generally indicated at 108 and a head stack assembly 116 supported by base 104. A pivot bearing cartridge installed within a bore of head stack assembly 116 includes a stationary shaft secured to the enclosure to define an axis of rotation for the rotary actuator arrangement. Head stack assembly 116 includes a rotary actuator assembly including an actuator body 118, a pair of actuator arms 122, 124, a coil portion 128, and a flex circuit assembly 126. Disk drive 100 further includes a disk clamp 112 for clamping disk 110 to spindle motor 106 and a magnetic latch 114 for latching head stack assembly 116 when disk drive 100 is powered down.

Figure 2:
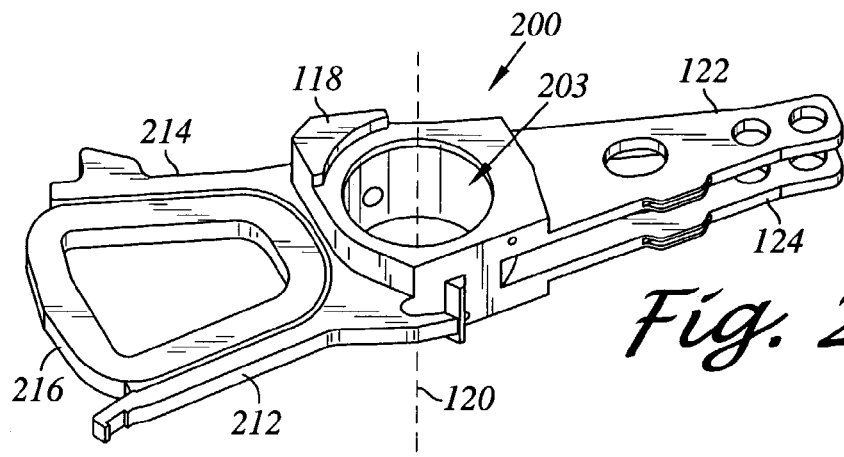
FIG. 2 is a perspective view of a rotary actuator assembly without a constrained layer damper.
Figure 3:
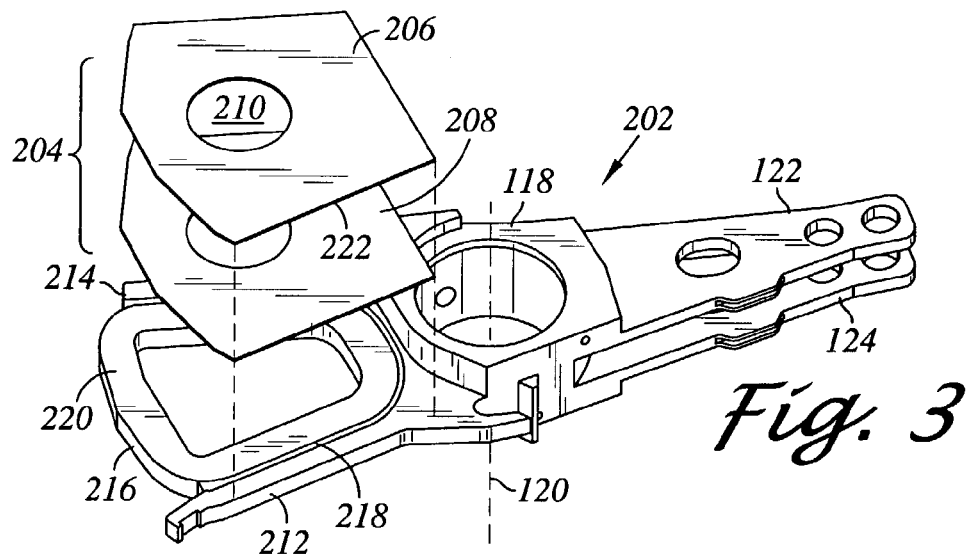
FIG. 3 is a perspective view of a rotary actuator assembly according to an embodiment of this invention in which a constrained layer damper is shown prior to its attachment to the coil portion.
Figure 4:
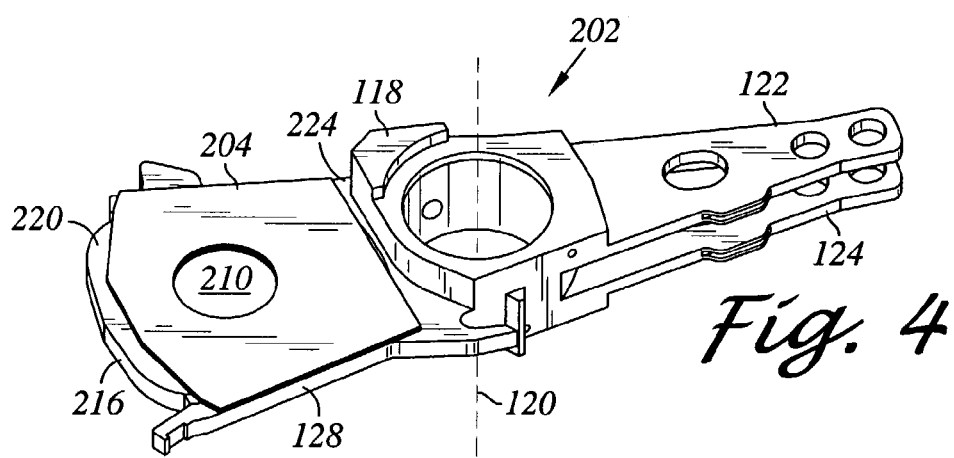
FIG. 4 is a perspective view of the rotary actuator assembly shown in FIG. 3 in which the constrained layer damper is attached to the coil portion.

With reference to FIGS. 2–4, a rotary actuator assembly 202 (most of which is shown in FIG. 2 as 200) includes actuator body 118 having a bore 203 defining a pivot axis' 120, actuator arm 122 cantilevered from actuator body 118, and coil portion 128 cantilevered from actuator body 118 in a direction opposite from actuator arm 122. Coil portion 128 includes a coil support 224, a flat coil 216 supported by coil support 224, flat coil 216 including a coil surface 220 generally perpendicular to pivot axis 120, and a constrained layer damper 204 attached to coil surface 220. Constrained layer damper 204 includes a stiffening layer 206 having a coil-facing planar surface 222 generally perpendicular to pivot axis 120 and an adhesive layer 208 positioned between coil-facing planar surface 222 and coil surface 224. Constrained layer damper 204 includes an aperture 210 and coil support 224 includes a pair of actuator fork ("wing") members 212, 214 for supporting flat coil 216. Moreover, constrained layer damper 204 overlaps actuator fork members 212, 214 as shown e.g., in FIG. 4. In the embodiment shown in FIG. 4, each radial side of constrained layer damper 204 is flushed with each respective radial side of actuator fork members 212, 214. In an alternative embodiment, constrained layer damper 204 may be sized and configured such that its radial sides are not flushed with the radial sides of actuator fork members 212, 214. In one embodiment, flat coil 216 is attached to coil support 224 via adhesive 218. In an alternative embodiment, flat coil 216 may be supported by a plastic overmolded coil support.

In a preferred embodiment, stiffening layer 206 is a non-magnetic metal layer and adhesive layer 208 is a viscoelastic adhesive layer. Suitably, the non-magnetic metal layer is formed from stainless steel, such as 300 series stainless steel, or aluminum and has a thickness of approximately 0.05 mm. Furthermore, the viscoelastic adhesive layer may have a suitable thickness of approximately 0.1 mm. Suitably, constrained layer damper 204 may be formed via a stamping process and aperture 210 may have a suitable shape such as circular, trapezoidal, rectangular, or elliptical. Aperture 210 disrupts the path of eddy currents induced by the current carrying flat coil in the presence of magnetic flux generated by permanent magnet arrangement 108 when disk drive 100 is in operation. In an alternative embodiment, constrained layer damper 204 may be free of aperture 210.

In the embodiment shown in FIGS. 3–4, constrained layer damper 204 is attached to the top side of flat coil 216. In an alternative embodiment, constrained layer damper 204 may be attached to the bottom side of flat coil 216. In a yet another embodiment, a pair of constrained layer dampers may be used, one on each side of flat coil 216. Also, while the embodiment shown in FIGS. 3–4 includes a constrained layer damper having two layers 206, 208, a constrained layer damper having more than two layers, such as four layers, may be used.

Advantageously, this invention reduces the amplitude of the butterfly resonance mode, increases its frequency, and improves its phase angle.

I claim:

1. A rotary actuator assembly for a disk drive comprising:
  an actuator body having a bore defining a pivot axis;
  an actuator arm cantilevered from the actuator body;
  a coil portion cantilevered from the actuator body in a direction opposite from the actuator arm;
  the coil portion including:
    a coil support;
    a flat coil supported by the coil support, the flat coil including a coil surface generally perpendicular to the pivot axis;
    a constrained layer damper attached to the coil surface and the coil support;
    the constrained layer damper including:
      a stiffening layer having a coil-facing planar surface generally perpendicular to the pivot axis; and an adhesive layer positioned between the coil facing planar surface and the coil surface, the adhesive layer abutting the coil surface and the coil support;

wherein the constrained layer damper includes an aperture.

2. The rotary actuator assembly of claim 1, wherein the adhesive layer is a viscoelastic adhesive layer.

3. The rotary actuator assembly of claim 1, wherein the coil support includes a pair of actuator fork members for supporting the flat coil and the constrained layer damper overlaps the actuator fork members.

4. A head stack assembly for a disk drive comprising:

a rotary actuator assembly including:

an actuator body having a bore defining a pivot axis;

an actuator arm cantilevered from the actuator body;

a coil portion cantilevered from the actuator body in a direction opposite from the actuator arm;

the coil portion including:

a coil support;

a flat coil supported by the coil support, the flat coil including a coil surface generally perpendicular to the pivot axis;

a constrained layer damper attached to the coil surface and the coil support;

the constrained layer damper including:

a stiffening layer having a coil-facing planar surface generally perpendicular to the pivot axis; and an adhesive layer positioned between the coil-facing planar surface and the coil surface, the adhesive layer abutting to the coil surface and the coil support;

wherein the constrained layer damper includes an aperture.

5. The head stack assembly of claim 4, wherein the adhesive layer is a viscoelastic adhesive layer.

6. The head stack assembly of claim 4, wherein the coil support includes a pair of actuator fork members for supporting the flat coil and the constrained layer damper overlaps the actuator fork members.

7. A disk drive comprising:

a base;

a spindle motor attached to the base;

a disk supported by the spindle motor; and a head stack assembly supported by the base;

the head stack assembly including:

a rotary actuator assembly including:

an actuator body having a bore defining a pivot axis;

an actuator arm cantilevered from the actuator body;

a coil portion cantilevered from the actuator body in a direction opposite from the actuator arm;

the coil portion including:

a coil support;

a flat coil supported by the coil support, the flat coil including a coil surface generally perpendicular to the pivot axis;

a constrained layer damper attached to the coil surface and the coil support;

the constrained layer damper including:

a stiffening layer having a coil-facing planar surface generally perpendicular to the pivot axis; and an adhesive layer positioned between the coil-facing planar surface and the coil surface, the adhesive layer abutting the coil surface and the coil support;

wherein the constrained layer damper includes an aperture.

8. The disk drive of claim 7, wherein the adhesive layer is a viscoelastic adhesive layer.

9. The disk drive of claim 7, wherein the coil support includes a pair of actuator fork members for supporting the flat coil and the constrained layer damper overlaps the actuator fork members.

* * * * *